May 22, 1956     J. J. SALM     2,747,077
PORTABLE WELDING LAMP
Filed July 27, 1953     2 Sheets–Sheet 2
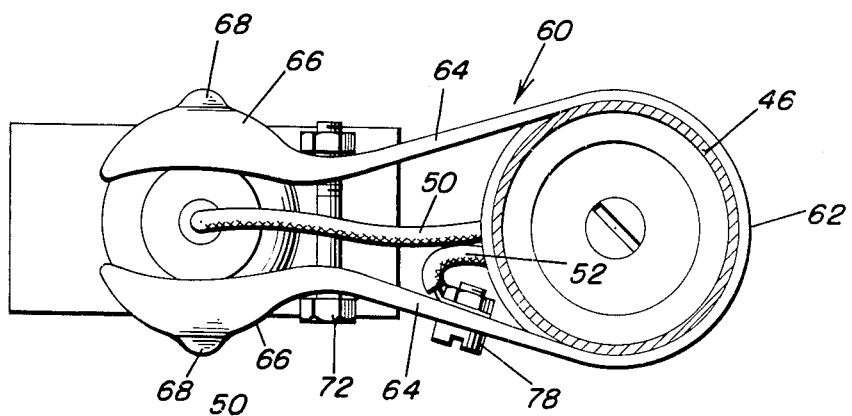
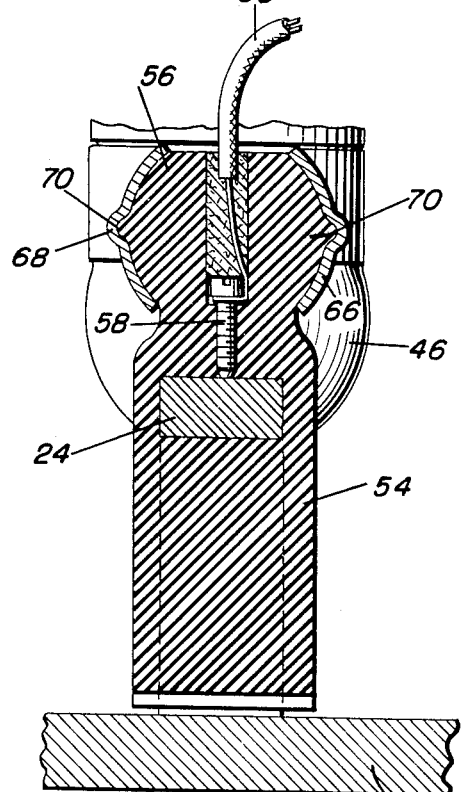
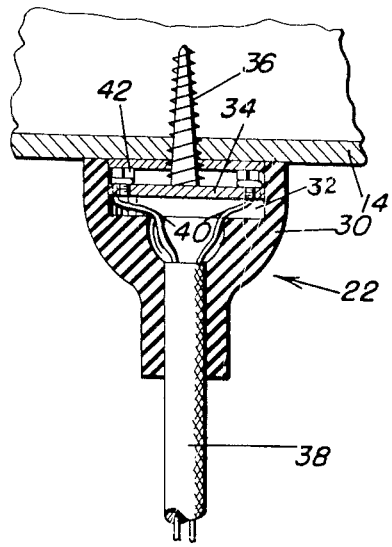
John J. Salm
INVENTOR.

United States Patent Office 2,747,077
Patented May 22, 1956

2,747,077

PORTABLE WELDING LAMP

John J. Salm, Vernon, N. Y.

Application July 27, 1953, Serial No. 370,285

4 Claims. (Cl. 240—2)

The present invention relates to arc welding, and more particularly relates to a portable electric light attachment for drawing current from the welding generator to illuminate the work piece being welded for purposes of inspection and the like.

The primary object of the invention is to provide an arc welding light that draws its current from the welding cables and wherein the intensity of the light will be greatest when the welding arc is terminated and will be least when the welding arc is drawn.

A very important object of the invention is the provision of a portable electric light attachment that may alternatively be mounted on the work piece to be welded or hooked over the work piece and grounded to the work piece in either of these positions.

Yet another object of the invention is to provide an attachment of the above described character which includes a novel plug arrangement for connecting the light socket to the electrode holder and a novel magnetic mounting bracket for mounting the socket on a work piece to be welded to provide a shunt circuit between the welding cables for energizing a light disposed in the socket.

Yet another object of the invention is to provide an electric light attachment adapted for drawing its current from the welding cables and wherein the light is of greatly lessened intensity than that of the welding arc whereby it will not hurt the eyes or skin, but which will permit ready visibility of the work piece.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top sectional view showing the mounting of the socket of the light attachment on the mounting bracket, taken substantially along section line 2—2 of Figure 1;

Figure 3 is a sectional view of the mounting base of the attachment, taken substantially along the plane of section line 3—3 of Figure 1; and Figure 4 is a cross-sectional view of the plug electrically connecting the attachment to the electrode holder, taken substantially along the plane of section line 4—4 of Figure 1.

Figure 1:
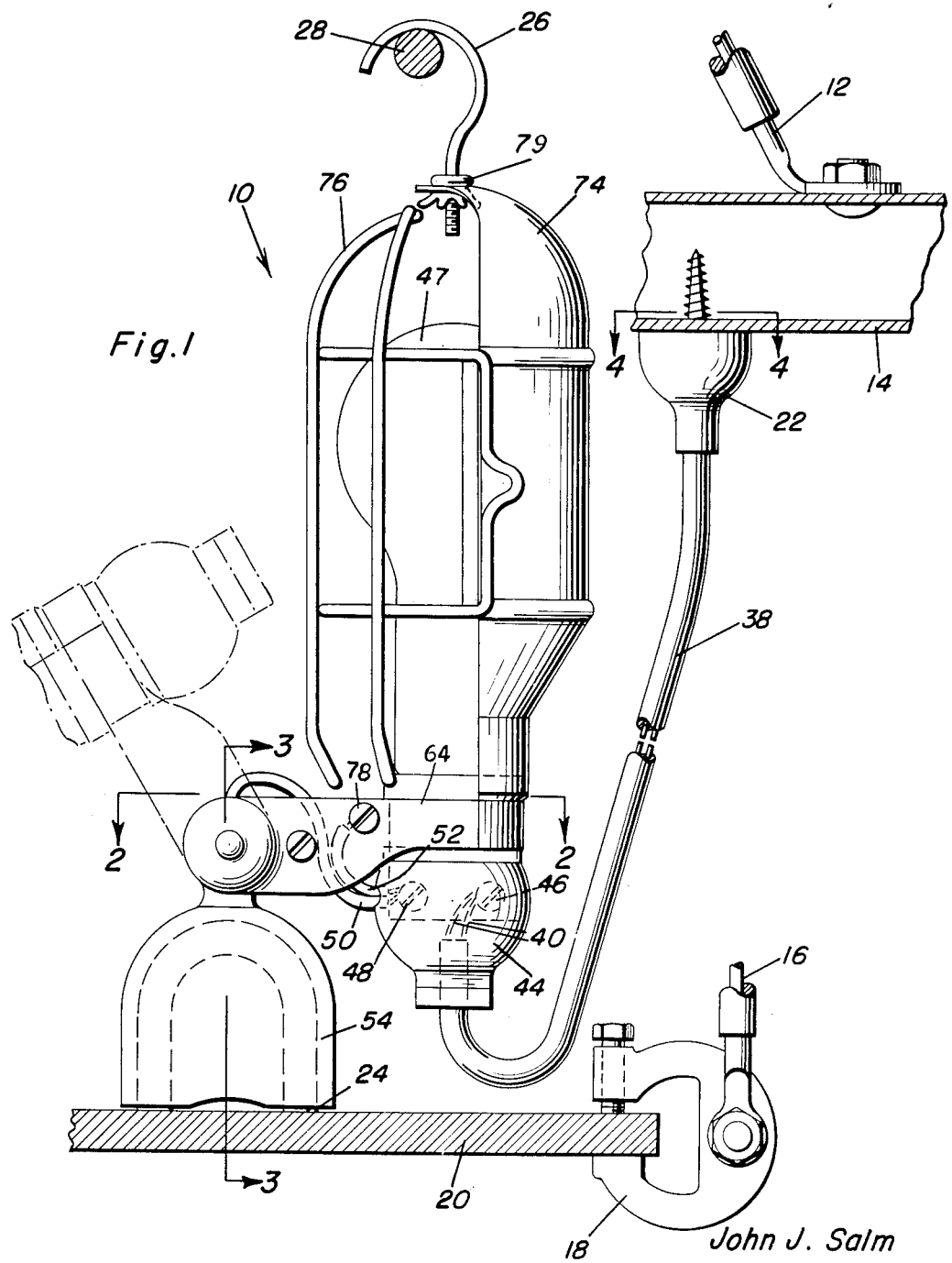
Figure 1 is a side elevational view of the portable light attachment of the present invention in operative position.

In Figure 1, the portable light attachment is designated in its entirety by the numeral 10. The welding cable constituting the positive conductor 12 is shown attached to an electrode holder 14 while the negative welding cable 16 is attached to a work piece engaging clamp 18 holding a work piece 20 to be welded.

The light attachment 10 is connected through a shunt circuit between the positive and negative conductors by means of the connector plug 22 attached to the electrode handle 14 and alternatively, a permanent magnet 24 attracted to the surface of the work piece 20 or the guard hook 26 hooked over the work piece 28.

The connector plug 22 consists of a suitable insulating sheath 30 having a recess 32 opening into one end thereof within which recess is the head 34, in the form of a spreader bar, of a screw 36 which projects outwardly from the recess and which is threaded into the electrode handle or holder 14.

Extension cord 38 terminates at its outer end within the plug 22 and the two wires 40 of this cord are attached to the terminals 42 on the spreader bar.

The inner end of the extension cord 38 extends into a suitably insulated light socket 44 and the wires 40 are secured at their inner ends to a single terminal 46 on the light socket 44. The socket 44 is a suitable bulb socket within which a light bulb 47 is secured.

From the second terminal 48 of the light bulb socket 44 extend two wires 50 and 52, respectively, which provide alternative ground circuit connections for the light attachment 10 to the negative cable 16 of the welding apparatus (not shown). One of these ground circuits is through the permanent magnet 24 while the other is through the guard hook 26.

To mount the light attachment 10 on a substantially flat work piece, such as shown at 20, and to complete the ground circuit to the cable 16, the magnet 24, which is in the form of a conventional horseshoe magnet, is encased or covered with a rubber, or other suitable, insulating sheath 54 to leave only the ends of the magnet exposed so they may attach themselves to the work surface 20. The sheath 54 above the magnet 24 is formed into a ball head 56 having a central bore therethrough, by means of which the ground wire or cable 50 is electrically connected by means of a suitable screw 58 to the bight portion of the magnet. This completes the ground connection from the socket to the negative welding cable 16 and thus completes the shunt circuit.

To mount the socket 44, a substantially U-shaped supporting bracket 60 is provided having a bight portion 62 frictionally embracing the socket 44 and legs 64 which extend toward the magnet 24. The free ends of the legs 64 are formed in the shape of cups having concave seating surfaces conforming to the curvature of the ball head 56. These cups are designated by the numeral 66. Detents 68 are formed on the central portion of each of the cups 66 and the ball head 56 is formed with diametrically opposed lugs 70.

Intermediate the ends of the legs 64, these legs are connected to one another by means of an adjustable fastener 72 which allows the legs to be spread apart or pulled toward one another.

To mount the socket, the legs 64 are first spread apart and placed on opposite sides of the ball head 56 of the magnet covering 54; then, the fastener 72 is tightened to frictionally engage the concave surfaces of the cups 66 on opposite sides of the ball head 56 so that the lugs 70 project into the detents 68. With this construction, the support bracket 60 is permitted to pivot about the ball head 56 to consequently pivot or swing the light socket 44 to adjust the angle of the bulb 47 to shed the light where it is most desired. Obviously, by tightening the fastener 72 and increasing the frictional engagement of the cups 66 with the head 56, the socket 44 may be held in any selected swung position.

Suitably secured to the bight portion 62 of the bracket 60 is an upstanding reflector 74 to which is hinged a bulb guard 76. To the upper end of the reflector or shield 74, the guard hook 26 is rotatably secured.

To mount the light attachment 10 on an arcuate type work piece, the second ground conductor or wire 52 extends from the terminal 48 to a second terminal 78 on one of the legs 64 of the bracket 60, thereby completing the alternative ground connection to the welding cable 16 through the work piece 28 and the guard hook 26.

The guard hook 26 is suitably secured to the reflector 74 as at 79 so that the angular position of the same can be easily adjusted and locked for stability and good electrical contact.

Because of the high resistance of the circuit through the light, the effect of this shunt mounting with either form of ground connection on the electrical setting of the welding generator is negligible. When an arc is drawn at the welding rod tip, the resulting drop in voltage across the light circuit greatly reduces the intensity of the light, which condition is highly desirable since additional light during actual welding is unnecessary. However, when the welding arc is discontinued, the light reaches its greatest intensity, which is also desirable, since it is at this time that the welder may inspect or set his work.

The particular connection of the plug 22 to the electrode holder 14 serves to prevent deterioration of the copper wires of the conductor 38 due to excessive heat, which occurs when this conductor is attached to the positive cable. By utilizing the plug 22, the terminals of the wires 40 are spaced and to a great degree insulated from the current supply by means of their termination within the plug and their electrical connection to the welding shield by means of the screw 36 into the electrode handle 14.

The magnet provides a novel arrangement for mounting the light attachment whereby the same may be quickly and simply mounted at any desired position on the work piece wherein the light attachment will be the most effective.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In an electric light attachment for a pair of welding cables, one being electrically connected to an electrode holder and the other being electrically attached to a work piece, the improvement comprising mounting means in engagement with the work piece to be welded, a light socket, means attaching said socket to said mounting means, a ground wire interconnecting said socket and mounting means, a current conductor leading from said socket and plug means on said conductor electrically attaching the same to the electrode holder whereby a shunt circuit is formed across the welding cables, said mounting means comprising a permanent magnet, an insulating sheath covering a portion of said magnet whereby the uncovered portions of the magnet are attached to the work piece, said ground wire being in contact with said magnet and permitting the same to be grounded when the magnet is attached to the work piece.

2. In an electric light attachment for a pair of welding cables, one being electrically connected to an electrode holder and the other being electrically attached to a work piece, the improvement comprising mounting means in engagement with the work piece to be welded, a light socket, means attaching said socket to said mounting means, a ground wire interconnecting said socket and mounting means, a current conductor leading from said socket and plug means on said conductor electrically attaching the same to the electrode holder whereby a shunt circuit is formed across the welding cables, said mounting means comprising a permanent magnet, an insulating sheath covering a portion of said magnet whereby the uncovered portions of the magnet are attached to the work piece, said ground wire being in contact with said magnet and permitting the same to be grounded when the magnet is attached to the work piece, said attaching means comprising a socket support bracket adjustably pivotally mounted on said mounting means.

3. In an electric light attachment for a pair of welding cables, one being electrically connected to an electrode holder and the other being electrically attached to a work piece, the improvement comprising mounting means in engagement with the work piece to be welded, a light socket, means attaching said socket to said mounting means, a ground wire interconnecting said socket and mounting means, a current conductor leading from said socket and plug means on said conductor electrically attaching the same to the electrode holder whereby a shunt circuit is formed across the welding cables, said mounting means comprising a permanent magnet, an insulating sheath covering a portion of said magnet whereby the uncovered portions of the magnet are attached to the work piece, said ground wire being in contact with said magnet and permitting the same to be grounded when the magnet is attached to the work piece, said attaching means comprising a socket support bracket adjustably pivotally mounted on said mounting means, said plug means including a pointed member for puncturing the sheath of the electrode holder to tap the welding cable.

4. In an electric light attachment for a pair of welding cables, one being electrically connected to an electrode holder and the other being electrically attached to a work piece, the improvement comprising mounting means in engagement with the work piece to be welded, a light socket, means attaching said socket to said mounting means, a ground wire interconnecting said socket and mounting means, a current conductor leading from said socket and plug means on said conductor electrically attaching the same to the electrode holder whereby a shunt circuit is formed across the welding cables, said mounting means comprising a permanent magnet, an insulating sheath covering a portion of said magnet whereby the uncovered portions of the magnet are attached to the work piece, said ground wire being in contact with said magnet and permitting the same to be grounded when the magnet is attached to the work piece, said covering having a ball head thereon, said attaching means including a U-shaped support having a bight portion and legs, said bight portion encircling said socket, the free end of said legs forming concave seats seating against opposite sides of said ball head, and adjustable means interconnecting said legs to vary the frictional engagement of the concave seats with the head.

References Cited in the file of this patent

UNITED STATES PATENTS

| | | |
|---|---|---|
| 1,561,554 | Little | Nov. 17, 1925 |
| 1,932,143 | Piercy | Oct. 24, 1933 |
| 2,046,999 | Bredtschneider | July 7, 1936 |
| 2,460,173 | Halbing | Jan. 25, 1949 |
| 2,669,650 | Smith | Feb. 16, 1954 |

FOREIGN PATENTS

| | | |
|---|---|---|
| 132,045 | Australia | Apr. 4, 1949 |